Sept. 4, 1945.  C. L. KINDER  2,384,422
INTERNAL-COMBUSTION ENGINE
Filed March 22, 1944  2 Sheets-Sheet 1

INVENTOR.
Cloyd L. Kinder
BY Carlos G. Stratton
ATTORNEY.

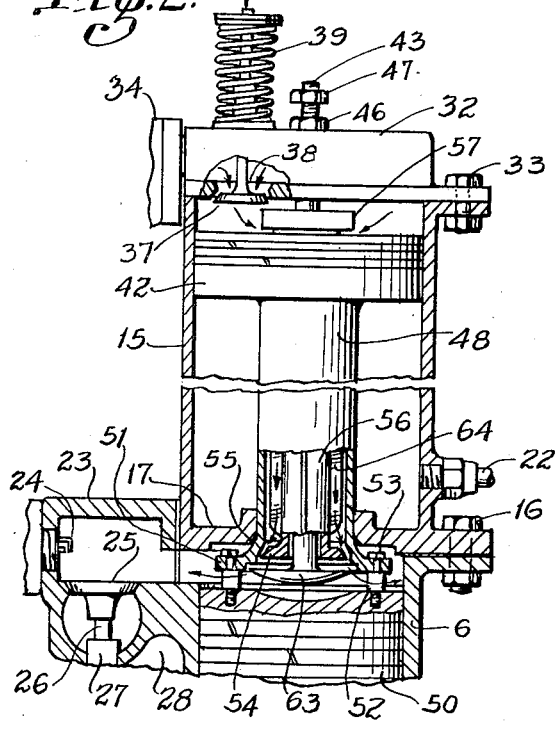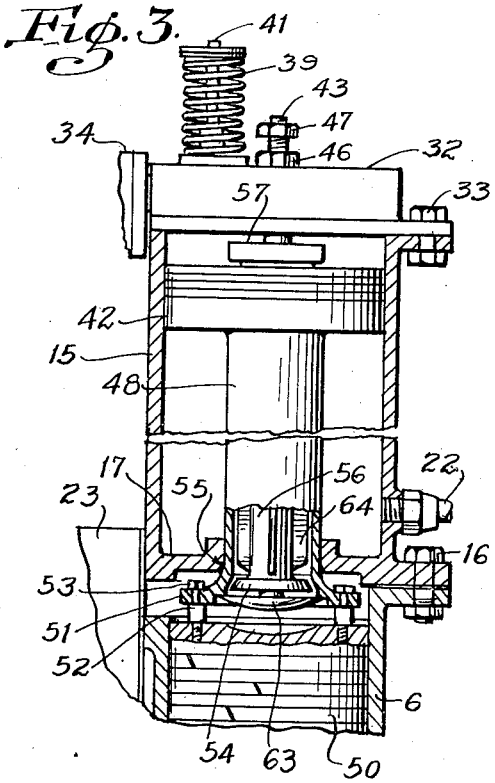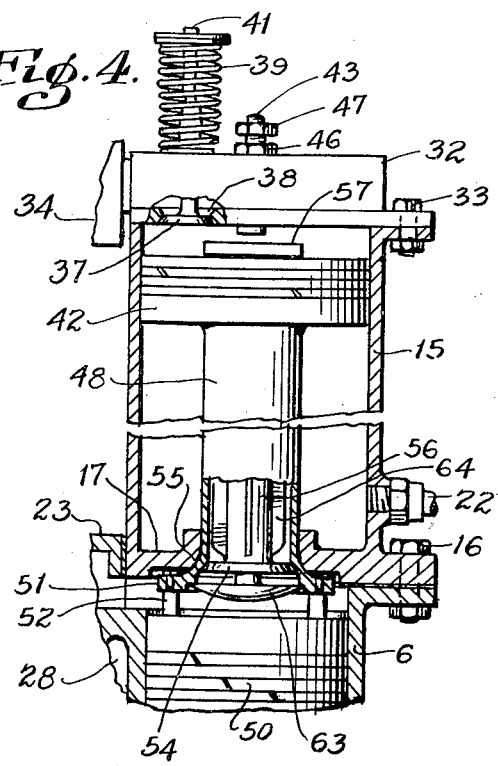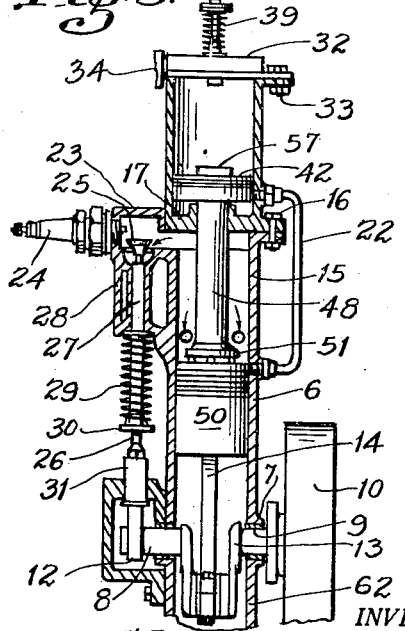
INVENTOR.
Cloyd L. Kinder
BY Carlos G. Stratton
ATTORNEY.

Patented Sept. 4, 1945

2,384,422

UNITED STATES PATENT OFFICE 2,384,422

INTERNAL-COMBUSTION ENGINE

Cloyd Lee Kinder, East Pasadena, Calif.; Verna Kinder administratrix of said Cloyd Lee Kinder, deceased Application March 22, 1944, Serial No. 527,605

9 Claims. (Cl. 123—71)

My invention relates to an internal combustion engine, and more particularly to a two-cycle engine substantially employing the four-cycle principle.

Another object is to arrange a plurality of pistons in tandem arrangement in an internal combustion engine, to provide means for the compression, scavenging and exhaust steps in the operation of the engine.

Still another object is to provide positively controlled valve means for the intake of compressed fuel into the combustion chamber.

A further object is to provide a plurality of intake valves for the fuel that will include a check valve as well as valve means for admitting the fuel when the piston means has reached a predetermined point in the operation of the engine.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figs. 2, 3 and 4 are reduced vertical sections, still further broken away, illustrating successive steps in the operation of my engine.

Fig. 5 is a still further reduced vertical section, generally similar to Fig. 1, but showing the exhausting position of my engine.

Figure 1:
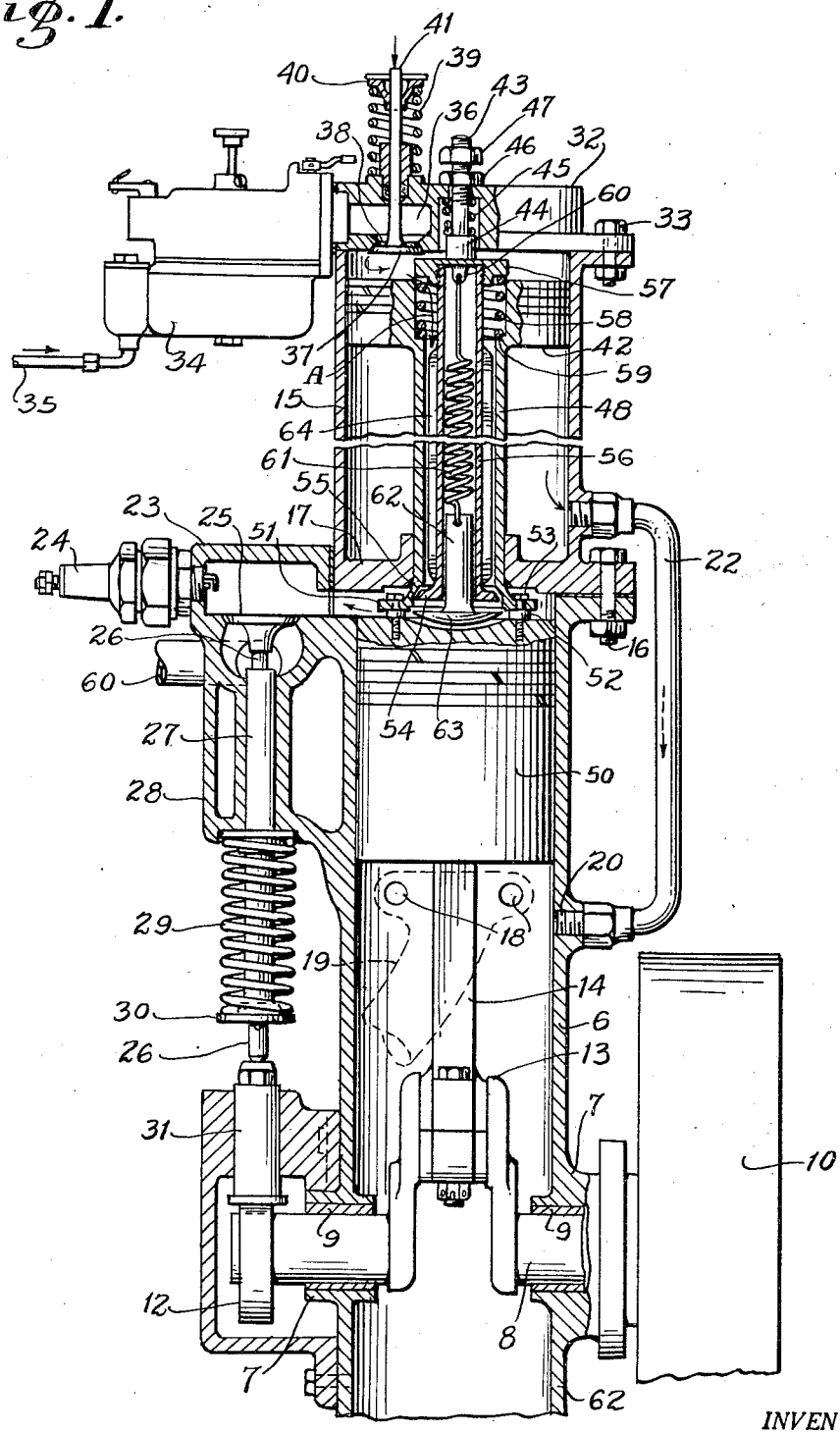
Fig. 1 is a vertical section, partly broken away, of an engine embodying the foregoing objects.

Referring more in detail to the drawings, the reference number 6 generally indicates the wall of the combustion cylinder. The wall 6 has journal-supporting bosses 7 for a crankshaft 8. Bushings 9 are disposed between the crankshaft and the journal 7. A flywheel 10 is arranged on an end of the crankshaft. It is believed clear without further illustration that any suitable, conventional flywheel magneto (not shown) may be encased in the flywheel.

The crankshaft 8 carries a cam 12 and has a throw 13 that has a suitable connection with a connecting rod 14.

A compression-supercharging cylinder 15 is bolted on the cylinder wall 6, as shown at 16, with the axes of the bores of the tandem cylinders 6 and 15 in alinement with each other. The outer cylinder 15 has a wall 17 that separates the interior of the cylinder 15 from the interior of the cylinder 6.

The cylinder 6 has exhaust ports 18 leading to an exhaust manifold 19. Nearer to the axis of the crankshaft than the exhaust ports 18, the the cylinder 6 has a port 20 that is connected with a port 21 near the wall 17 in the cylinder 15, by means of a breather tube 22.

The combustion chamber 6 is inverted L shaped, with an ignition chamber 23 provided with spark plug means 24. The ignition chamber 23 has a scavenging valve 25, whose stem 26 operates in a sleeve 27 in a water jacket portion 28 of the cylinder 6. A coil spring 29, abutting against a collar 30 on the valve stem 26, tends to move the scavenging valve 25 to a closed position. A reciprocating plunger 31 abuts against the lower end of the valve stem 26 and is in turn actuated by the cam 12 against the action of the spring 29, to open the scavenging valve 25. A conduit 60 provides an outlet for gases of combustion driven past valve 25.

A head 32 for the engine is bolted to the cylinder 15, as suggested at 33. The head carries a carburetor 34 to which fuel is fed by a gas line 35. The carburetor 34 may be of conventional construction, and since per se it does not constitute the present invention, further illustration and description are believed unnecessary. Suffice to say that gasified fuel is fed into the fuel chamber 36 in the head 32, from the carburetor.

A fuel valve 37 controls an outlet 38 from the fuel chamber 36. A closing, coil spring 39 tends to hold the fuel valve 37 in a closed position. The spring 39 abuts against a stop 40 on the stem 41 of the valve 37, and against the outer face of the engine head 32. Suction caused by the supercharging piston 42 in the cylinder 15 opens the valve 37, against the action of the closing spring 39. If desired, other, positive means (not shown) may also be employed to exert energy upon the stem 41 in the direction of the arrow touching the outer end of the stem 41 in Figs. 1 and 2.

Concentric with the head 32 is a threaded, adjusting pin stop 43 having a collar 44. A relatively strong spring 45 tends to hold the pin 43 in a position in which it projects into the cylinder 15. A limiting nut 46 on the pin 43 adjustably controls the amount that the pin 43 projects into the cylinder 15. A lock nut 47 may be screwed down from the position shown in the drawings, to a position locking the nut 46 in position.

The piston 42 is connected by a hollow piston rod 48, through the wall 17, to the main operating piston 50 of the engine. The hollow piston rod 48 is shown integral with the piston 42 and has a circular flange 51 that is bolted to the piston 50 in a spaced relation afforded by spacing sleeves 52 on the bolts 53. The pistons are thereby connected and arranged in tandem.

The hollow piston rod 48 has a valve seat 55 interiorly at the inner end thereof. A gas inlet valve 54 is movable to engage the seat 55. The valve 54 has a hollow stem 56 that is threaded on its outer end to receive a nut 57. The nut provides an abutment for a coil spring 58 that also abuts against a shoulder 59 within the piston 42.

The nut 57 has a lug 60 extending into the hollow stem 56. A coil spring 61 connects the lug 60 with a stem 62 of a check valve 63. Quadrant fins 64 on the hollow stem 56 center same within the hollow piston rod 48.

It is to be noted that the inside diameter of the combustion cylinder 6 is less than the inside diameter of the compression cylinder 15, and it is believed clear that suitable piston rings are employed on the pistons.

In the operation of my engine, fuel is supplied through the fuel line 35 and gasified in the usual manner by the carburetor 34. The gasified fuel is introduced into the fuel chamber 36. The engine is initially turned over by any conventional means; e. g., a starter or a crank (not shown), which causes conjoint reciprocation of the pistons 42 and 50, through the intermediary of the crank shaft 8, the connecting rod 14, and the joining piston rod 48.

On the downward stroke of the piston 42, shown in the drawings, fuel in the chamber 36 is drawn into the cylinder 15, as shown in Fig. 2. As soon as the piston 50 covers the port 20, the piston 42 begins compression of the, previously drawn in through the breather pipe 22, on the upward movement of the piston 42, air in that portion of the cylinder 15 between the piston 42 and the wall 17.

The downward movement of the piston 50, as shown in the drawings, first uncovers the exhaust ports for the escape of spent gases of combustion from the previous cycle of operation, as shown in Fig. 5. About this point in the operation, the cam 12 opens the scavenging valve 25. Upon further downward movement of the piston 50, the port 20 is uncovered, which permits the air compressed in the cylinder 15, between the piston 42 and the wall 17, to travel through the breather pipe 22 into the cylinder 6 through the port 60, driving any remaining gases of combustion out through the pipe 60 past the valve 25.

Then upon the upward stroke, the piston 50 covers the scavenging port 20 and then the exhaust ports 18, but the piston 50 continues to scavenge the chamber 6, by upward movement of the piston, since the valve 25 is maintained open until near top dead center of the pistons and until approximately the point where the valve 54 is opened to admit compressed fuel to the combustion chamber 6.

On the upward stroke of the supercharging piston 42, the fuel previously drawn into the cylinder 15 is being compressed. When the piston 57 reaches the point where it engages the collar 44 on the pin 43, the valve 54 is opened by the slight, continued upward movement of the piston 42, while the relatively strong spring 45 behind the collar 44 is preventing the valve stem 56 and its valve 54 from said continuing, upward movement. This point in the operation is illustrated in Fig. 3. It will be noticed in Fig. 3 that there is sufficient space between the valves 54 and 63 to permit the inner valve 54 to be opened without unseating the outer valve 63 from the latter's closed position.

Just before top dead center, compressed fuel in the cylinder 15, above the piston 42, then passes under the nut 57, as suggested by the arrow A, in Fig. 1, and passes down around the stem 56, inside the hollow piston rod 48, thereby cooling the stem 56 and the hollow piston rod 48, and then passes the valve 54. The pressure upon the fuel opens the check valve 63 against the action of the spring 61, as shown in Fig. 1, so that the already compressed fuel may enter the combustion chamber 6 above the piston 50. The pistons then begin their down strokes, permitting the valves 54 and 63 to close, as in Fig. 4. The fuel is thereupon ignited by the spark plug 24. This ignition drives the piston 50 downward, which carries with it the piston 42, as described in the previous cycle of operation.

When the piston 50 uncovers the scavenging port 20 on its upstroke, air is drawn from the crankcase 62 through the port 20, through the breather pipe 22 and into the cylinder 15 by the suction of the upward movement of the piston 42.

It is to be understood that the spring 45 is comparatively stiff, and that the spring 58 is a stronger spring than the spring 61. The spring 58 is in turn a weaker spring than the spring 45. The valve 63 is an automatic check valve to prevent the escape of compressed fuel until the lower piston 50 is in position, even though the nut has engaged the collar 44 (see Fig. 3). The inner valve 54 controls the passage of compressed fuel to the combustion chamber.

The relationship whereby the compressed fuel is not introduced into the combustion chamber until near top dead center of the stroke of the piston 50, permits such piston to use its upstroke, up to such point to scavenge the combustion chamber.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In an internal combustion engine, tandem cylinders divided from each other, tandem pistons in the cylinders, a hollow rod connecting the pistons to each other, a relatively movable hollow stem within the hollow rod and spaced therefrom to provide a passage between the rod and the stem, a valve on the stem movable therewith to close said passage, said valve being movable to an open position at a given point in the movement of the pistons, the hollow rod connecting the cylinders at the sides of the pistons therein, and a valve having a stem in said hollow stem and guided thereby, the latter valve being movable to close the passage by a differential of pressures at said sides of the pistons.

2. In an internal combustion engine, tandem cylinders divided from each other, tandem pistons in the cylinders, a hollow rod connecting the pistons to each other, a relatively movable, hollow stem within the hollow rod and spaced therefrom to provide a passage between the rod and the stem, an inner valve on the stem movable therewith to close said passage, the hollow rod connecting the cylinders with each other, means arranged to mechanically open said valve at a given point in the operation of the engine, and an outer valve having a guiding stem in the inner valve, the outer valve being arranged to be moved to close the passage by ignition of fuel in the cylinder to which the fuel is supplied.

3. In an internal combustion engine, a plurality of cylinders, pistons in the cylinders, a hollow rod connected to be driven by one of the pistons, a relatively movable, hollow stem within the hollow rod and spaced therefrom to provide a passage between the rod and the stem, a valve on the stem movable therewith to close said passage, the hollow rod being connected to convey fuel, a check valve also arranged to close the hollow rod, having a guiding stem in said hollow stem, spring means tending to move the latter valve to a closed position, said spring means being of such weakness that the flow of fuel in the hollow rod opens the check valve, the spring being disposed to close the check valve when the flow of fuel subsides, and spring means tending to close the first-mentioned valve, the latter spring means being stronger than the pressure of the fuel, and means arranged to move the first-mentioned valve to an open position, at a given point in the operation of the engine, against the action of the latter spring, the other piston being arranged and connected to compress the fuel and supply the compressed fuel to the hollow rod.

4. In an internal combustion engine, a plurality of cylinders, pistons in the cylinders, a hollow rod connected to be driven by one of the pistons, a relatively movable, hollow stem within the hollow rod and spaced therefrom to provide a passage between the rod and the stem, a valve on the stem movable therewith to close said passage, the hollow rod being connected to convey fuel, a check valve also arranged to close the passage, spring means tending to move the valve and the check valve to closed positions, the valve and check valve being arranged to be closed independently and to be opened independently, whereby the check valve may close while the valve is open, the other piston being arranged and connected to compress the fuel and supply the compressed fuel to the hollow rod, and means arranged to open the valve when the compressing piston reaches a predetermined point, against the action of the controlling spring means, the spring means being arranged to close the check valve when the flow of compressed fuel through the hollow rod subsides.

5. In an internal combustion engine, tandem cylinders divided from each other, tandem pistons in the cylinders, a hollow rod connecting the pistons to each other, a relatively movable, hollow stem within the hollow rod and spaced therefrom to provide a passage between the rod and the stem, an inner valve on the stem movable therewith to close said passage, the hollow rod connecting the cylinders with each other, an outer valve having a guiding stem in the inner valve, the outer valve being arranged to be moved to close the passage by ignition of fuel in the cylinder to which the fuel is supplied, spring means within the hollow stem tending to move the outer valve to a closed position, the outer valve being arranged to be opened by pressure of the fuel and to be closed by ignition of the fuel in the cylinder to which the fuel is supplied, spring means tending to move the inner valve to a closed position, means to open the inner valve against the action of its spring means, at a predetermined point in the operation of the engine.

6. In an internal combustion engine, a combustion cylinder and a supercharging cylinder arranged in alinement, the supercharging cylinder being or larger diameter than the combustion cylinder, pistons fitting in the cylinders, a rod connecting the pistons to effect their conjoint movement, a crankcase connecting with the combustion cylinder, conduit means having a port connecting the crankcase with the supercharging cylinder at one side of the piston, therein, the other side of the supercharging piston being connected with the combustion side of the piston in the combustion chamber, the supercharging piston being arranged to draw air through the conduit means into the supercharging cylinder, the piston in the combustion cylinder being movable to close said port during the inward stroke of pistons, the supercharging piston being arranged for its continued inward movement to compress air entrapped in the supercharging cylinder, the combustion piston being arranged to uncover said port by continued inward movement, admitting compressed air from the supercharging chamber, through the conduit means and into the combustion chamber near the inner end of the combustion stroke, and scavenging valve means connected to be opened for the escape of the compressed air carrying spent gases of combustion with it.

7. In an internal combustion engine, a combustion cylinder and a supercharging cylinder arranged in alinement, pistons fitting in the cylinders, a rod connecting the pistons to effect their conjoint movement, the combustion chamber having an exhaust port and having a scavenging port farther along in the direction of movement of the pistons on the power stroke, conduit means connecting the scavenging port with the supercharging cylinder at one side of the piston therein to draw air into the supercharging cylinder on the outer stroke of the supercharging piston, the piston in the combustion cylinder being movable to close said port during the inward stroke of pistons, the supercharging piston being arranged for its continued inward movement to compress air entrapped in the supercharging cylinder, the other side of the supercharging piston being connected to compress fuel and to supply the combustion cylinder with the compressed fuel, the power piston in the combustion chamber being movable to uncover the exhaust port first and then to uncover the scavenging port, and scavenging valve means connected to be open after the power piston has covered the exhaust port for the continued scavenging of gases of combustion.

8. An internal combustion engine according to claim 7, in which means are provided for maintaining the scavenging valve open approximately until fuel compressed by the supercharging cylinder is being introduced into the combustion chamber.

9. In an internal combustion engine, a combustion cylinder and a supercharging cylinder, pistons in the cylinders, the pistons being connected for conjoint operation, the combustion chamber having a scavenging port, conduit means connecting the scavenging port with the supercharging cylinder at one side of the piston therein to draw air into the supercharging cylinder on one stroke of the supercharging piston, the power piston in the combustion chamber covering said port during the power stroke of such piston, the supercharging piston being arranged to compress air thereby entrapped in the supercharging cylinder, the other side of the supercharging piston being connected to compress fuel and to supply the combustion cylinder with the compressed fuel, the power piston being movable to uncover the scavenging port, and scavenging valve means connected to be open substantially during the return stroke of the power piston for the escape of the compressed air, carrying spent gases of combustion with it.

CLOYD LEE KINDER.